United States Patent
Srinivasan et al.

(10) Patent No.: US 12,001,206 B2
(45) Date of Patent: Jun. 4, 2024

(54) METHODS AND SYSTEMS FOR REMOTE OPERATION OF VEHICLES USING HANDS-FREE FUNCTIONALITY

(71) Applicant: HONEYWELL INTERNATIONAL INC., Morris Plains, NJ (US)

(72) Inventors: Narayanan Srinivasan, Chennai (IN); Kiran Gopala Krishna, Bangalore (IN); Gobinathan Baladhandapani, Madurai (IN); Hariharan Saptharishi, Trichy (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1003 days.

(21) Appl. No.: 16/921,699

(22) Filed: Jul. 6, 2020

(65) Prior Publication Data
US 2021/0223773 A1  Jul. 22, 2021

(51) Int. Cl.
  *G05D 1/00* (2006.01)
  *G06F 3/16* (2006.01)
  *G10L 15/26* (2006.01)

(52) U.S. Cl.
  CPC ......... *G05D 1/0061* (2013.01); *G05D 1/0088* (2013.01); *G05D 1/101* (2013.01); *G06F 3/167* (2013.01); *G10L 15/26* (2013.01)

(58) Field of Classification Search
  CPC .... G05D 1/0061; G05D 1/0088; G05D 1/101; G05D 1/0011; G06F 3/167; G10L 15/26; G10L 13/00
  See application file for complete search history.

(56) References Cited

U.S. PATENT DOCUMENTS

| | | |
|---|---|---|
| 6,335,694 B1 | 1/2002 | Beksa et al. |
| 7,912,592 B2 | 3/2011 | Komer et al. |
| 8,195,459 B1 | 6/2012 | Brand |
| 8,515,763 B2 | 8/2013 | Dong et al. |
| 8,666,748 B2 | 3/2014 | Dong et al. |
| 8,793,139 B1 | 7/2014 | Serban et al. |
| 9,550,578 B2 | 1/2017 | McCullough et al. |
| 2003/0146853 A1 | 8/2003 | Bolduc |

(Continued)

FOREIGN PATENT DOCUMENTS

DE  102011106271  1/2013

OTHER PUBLICATIONS

Voice Activated Cockpit; © 2016 Adacel Technologies Limited; Jun. 12, 2018.

*Primary Examiner* — Richard M Camby
(74) *Attorney, Agent, or Firm* — Lorenz & Kopf LLP

(57) ABSTRACT

Methods and systems are provided for autonomously enabling remote operation of a vehicle such as an aircraft in response to detecting an event that may impact manual operation of the vehicle. One method autonomously detects an event with respect to manual operation of the vehicle based at least in part on output from one or more systems onboard the vehicle, identifies a hands-free functionality of a vehicle system to be activated based at least in part on a characteristic of the event, and autonomously initiates activation of the hands-free functionality of the vehicle system. A command for operating the vehicle is received from an external system via an onboard communications system and provided to the vehicle system for further implementation or execution using the hands-free functionality.

17 Claims, 6 Drawing Sheets

(56) References Cited

U.S. PATENT DOCUMENTS

| | | | |
|---|---|---|---|
| 2006/0206246 A1* | 9/2006 | Walker | H04L 63/302 |
| | | | 701/16 |
| 2011/0125503 A1 | 5/2011 | Dong et al. | |
| 2013/0331056 A1 | 12/2013 | McKown et al. | |
| 2017/0277185 A1* | 9/2017 | Duda | B64C 13/18 |
| 2017/0324437 A1* | 11/2017 | Ruttler | G08B 21/0211 |
| 2018/0364707 A1* | 12/2018 | Bosworth | G05D 1/0676 |
| 2019/0019423 A1* | 1/2019 | Choi | G05D 1/0088 |
| 2019/0031367 A1* | 1/2019 | Olivo | G08G 5/0013 |
| 2019/0033888 A1* | 1/2019 | Bosworth | B64C 13/16 |
| 2019/0321981 A1* | 10/2019 | Bosworth | B25J 9/04 |

* cited by examiner

METHODS AND SYSTEMS FOR REMOTE OPERATION OF VEHICLES USING HANDS-FREE FUNCTIONALITY

CROSS REFERENCE TO RELATED APPLICATION

This application claims priority to Indian Provisional Patent Application No. 202011001930, filed Jan. 16, 2020, the entire content of which is incorporated by reference herein.

TECHNICAL FIELD

The subject matter described herein relates generally to vehicle systems, and more particularly, embodiments of the subject matter relate to aircraft systems capable of autonomously utilizing hands-free functionality and automation behavior to enable remote operation based on operating context.

BACKGROUND

Various forms of automation have been incorporated into vehicles to improve operations and reduce stress, fatigue, and other potential contributing factors for human error. For example, many modern aircraft incorporate a flight management system (FMS) and other avionics systems capable of providing autopilot functionality and other automated vehicle operations. While various forms of automation have been incorporated into vehicles such as aircraft, a vehicle operator often has to manually operate the vehicle in response to abnormal events or various other conditions or scenarios. However, in some situations, a pilot or other vehicle operator may become distracted, incapacitated or otherwise impaired with respect to his or her ability to operate the vehicle (e.g., due to workload, loss of situational awareness, etc.). Accordingly, it is desirable to provide aircraft systems and methods for mitigating potential pilot incapacity or other inability to fully operate the aircraft. Other desirable features and characteristics of the methods and systems will become apparent from the subsequent detailed description and the appended claims, taken in conjunction with the accompanying drawings and the preceding background.

BRIEF SUMMARY

Methods and systems are provided for operating a vehicle, such as an aircraft. One exemplary method of autonomously enabling remote operation of a vehicle involves autonomously detecting an event with respect to manual operation of the vehicle based at least in part on output from one or more systems onboard the vehicle, identifying a hands-free functionality of a vehicle system to be activated based at least in part on a characteristic of the event, autonomously initiating activation of the hands-free functionality of the vehicle system, receiving, from an external system via an onboard communications system, a command for operating the vehicle, and providing the command to the vehicle system using the hands-free functionality.

In another embodiment, a method of autonomously enabling remote control of an aircraft involves autonomously detecting an event with respect to manual operation of the aircraft based at least in part on output from a component onboard the aircraft, determining an onboard system to be activated based on a characteristic of the event, and autonomously initiating activation of a hands-free functionality of the onboard system. Thereafter, the onboard system receives, via the hands-free functionality, a command for an automated action and automatically performs the automated action in accordance with the command in response to receiving the command via the hands-free functionality.

In another embodiment, an aircraft system is provided. The aircraft system includes an avionics system onboard an aircraft, a second system onboard the aircraft to provide output data indicative of an event capable of impacting manual operation of the aircraft, and a processing system coupled to the avionics system and second system to autonomously detecting the event based at least in part on output from the second system and autonomously initiate activation of a hands-free functionality of the avionics system in response to detecting the event.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
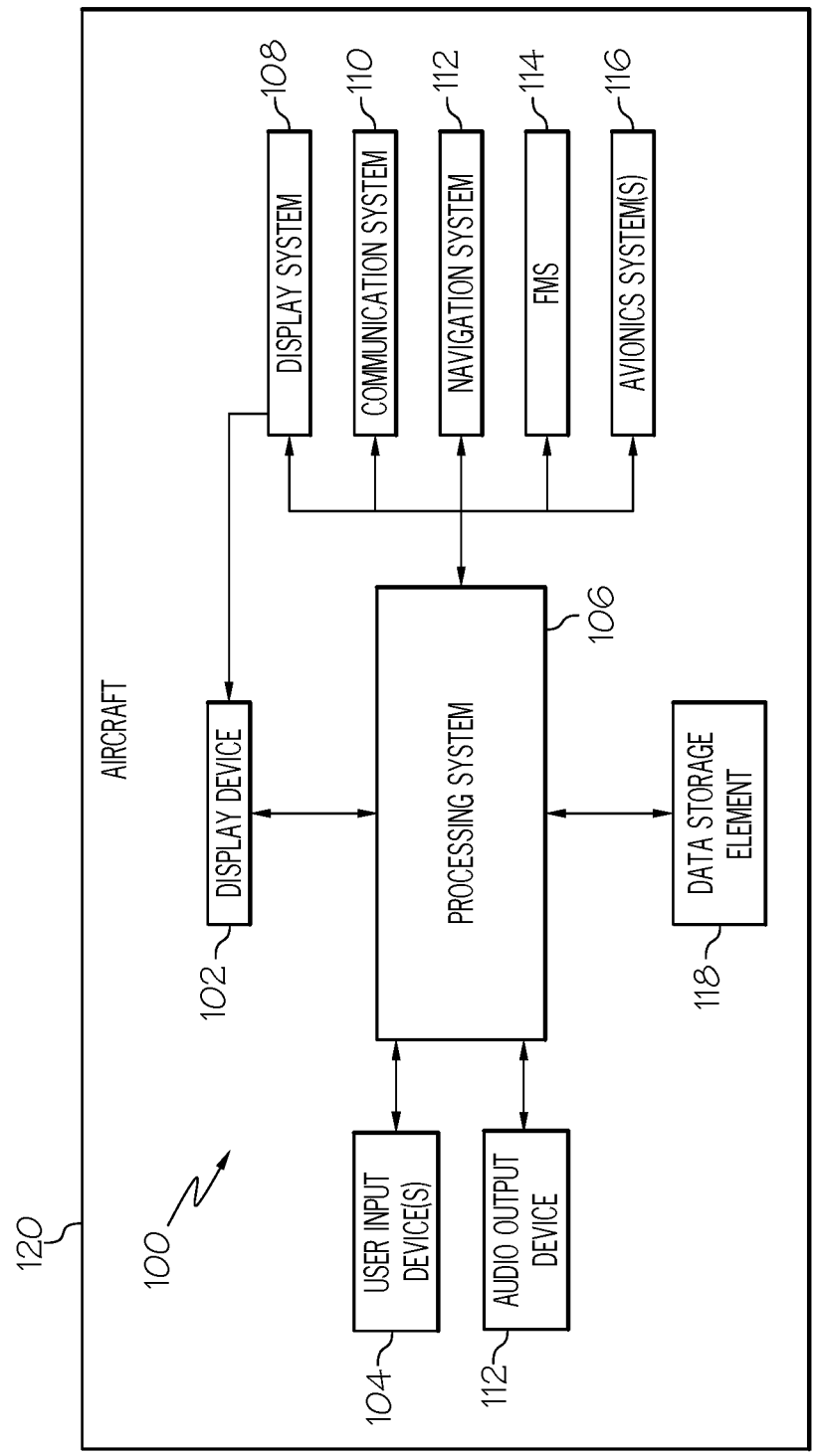
FIG. 1 is a block diagram of a system for an aircraft in an exemplary embodiment.

Embodiments of the subject matter described herein generally relate to systems and methods for autonomously enabling remote control or initiation of an automated vehicle action in response to detecting an event with respect to manual operation by a vehicle operator. In this regard, the automated action could be any action that involves one or more onboard systems autonomously adjusting a mechanical or electrical configuration of an onboard component to influence the vehicle's trajectory, path, speed, or other aspect of the vehicle's travel or operation. While the subject matter described herein could be utilized in various applications or in the context of various different types of vehicles (e.g., automobiles, marine vessels, trains, or the like), exemplary embodiments are described herein in the context of a pilot, co-pilot, or other operator of an aircraft.

As described in greater detail below in the context of FIGS. 2-5, an event that could potentially impact manual operation of the aircraft based at least in part on output from one or more onboard systems. For example, the event could be any sort of environmental event onboard the aircraft capable of impairing or distracting a pilot, such as, for example, the presence of smoke, odor, fire, or the like within the cockpit of the aircraft. Alternatively, the event could be a mechanical or operational event that could complicate the pilot's ability to operate the aircraft, or another situation where the pilot may be unable to operate the aircraft (e.g., pilot incapacity, pilot rest period, a pilot exiting the cockpit to attend to matters elsewhere onboard the aircraft, a pilot performing manual inspections with respect to some aspect of the aircraft, and/or the like). Based on a type or characteristic of the detected event, the system identifies or otherwise determines which onboard systems should be enabled to interface or communicate with a remote operator or other external system and autonomously initiates activation of a hands-free functionality of the onboard system (e.g., speech-to-text functionality and/or text-to-speech functionality). The hands-free functionality is then utilized to provide a communications bridge to enable remote control of the aircraft and/or provide operating information to an external system. In this manner, an external device or system that is unable to communicate directly with a particular onboard system is capable of communicating indirectly via the hands-free functionality, thereby enabling the external system to remotely control or operate the onboard system or otherwise receive information pertaining to operation of the aircraft from the onboard system. For example, a speech-to-text or speech recognition functionality of an autopilot system may be autonomously activated when a pilot is incapacitated, unavailable, or otherwise unable to manually operate the aircraft to allow a remote operator at an external system to provide commands for performing an automated action to the autopilot system, which, in turn, autonomously adjusts a flight control surface or other onboard component to influence the aircraft's trajectory, path, speed, or the like in accordance with the command provided by the remote operator.

FIG. 1 depicts an exemplary embodiment of a system 100 which may be utilized with a vehicle 120, such as an aircraft. In an exemplary embodiment, the system 100 includes, without limitation, a display device 102, one or more user input device(s) 104, one or more audio output device(s) 105, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In the illustrated embodiment of FIG. 1, the display device 102 is coupled to the display system 108 and the processing system 106, with the processing system 106 and the display system 108 being cooperatively configured to display, render, or otherwise convey one or more graphical representations or images associated with operation of the aircraft 120 on the display device 102, such as for example, lateral map displays or other navigational maps, synthetic or perspective displays, vertical profile or vertical situation displays, and the like.

The user input device 104 is coupled to the processing system 106, and the user input device 104 and the processing system 106 are cooperatively configured to allow a user (e.g., a pilot, co-pilot, or crew member) to interact with the display device 102 and/or other elements of the aircraft system 100, as described in greater detail below. Depending on the embodiment, the user input device 104 may be realized as a keypad, touchpad, keyboard, mouse, touch panel (or touchscreen), joystick, knob, line select key or another suitable device adapted to receive input from a user. In exemplary embodiments, the user input devices 104 also include one or more audio input devices, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

It should be appreciated that in practice, the aircraft 120 will likely include numerous different types of user input devices 104 onboard in the cockpit of the aircraft 120, and the number and type of user input devices may vary depending on the make of the aircraft 120, the model of the aircraft 120, the operator of the aircraft 120, and potentially other factors. Accordingly, the subject matter described herein is not limited to any particular type, number, or configuration of user input devices 104. Moreover, in various embodiments, one or more user input devices 104 may be communicatively coupled to one or more other systems 108, 110, 112, 114, 116 onboard the aircraft 120, either in parallel with or independently of the processing system 106, and in some embodiments, the processing system 106 may receive user inputs indirectly via one or more other systems 108, 110, 112, 114, 116 onboard the aircraft 120.

The audio output device(s) 105 are cooperatively configured to provide auditory feedback to a user, as described in greater detail below. Depending on the embodiment, the audio output device 105 may be realized as a speaker, headphone, earphone, earbud, or another suitable device adapted to provide auditory output to a user. In this regard, in some embodiments, a user input device 104 and an audio output device 105 may be integrated on a single headset, as will be appreciated in the art. Again, it should be appreciated that in practice, the aircraft 120 may include numerous different types of audio output devices 105 onboard in the cockpit of the aircraft 120, and the number and type of audio output devices may vary depending on the make, the model, and/or the operator of the aircraft 120, and potentially other factors, and as such, the subject matter described herein is not limited to any particular type, number, or configuration of audio output devices 105. Moreover, in various embodiments, one or more audio output devices 105 may be communicatively coupled to one or more other systems 108, 110, 112, 114, 116 onboard the aircraft 120, either in parallel with or independently of the processing system 106, and in some embodiments, the processing system 106 may provide outputs to such audio output devices 105 indirectly via one or more other systems 108, 110, 112, 114, 116 onboard the aircraft 120.

The processing system 106 generally represents the hardware, circuitry, processing logic, and/or other components configured to facilitate communications and/or interaction between the elements of the system 100 and perform additional processes, tasks and/or functions to support operation of the system 100, as described in greater detail below. Depending on the embodiment, the processing system 106 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 106 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 106, or in any practical combination thereof. In accordance with one or more embodiments, the processing system 106 includes or otherwise accesses a data storage element 118, such as a memory or another suitable non-transitory short or long term storage media capable of storing computer-executable programming instructions or other data for execution that, when read and executed by the processing system 106, cause the processing system 106 to execute and perform one or more of the processes, tasks, operations, and/or functions described herein. Depending on the embodiment, the data storage element 118 may be physically realized using RAM memory, ROM memory, flash memory, registers, a hard disk, or another suitable data storage medium known in the art or any suitable combination thereof. In one or more embodiments, the data storage element 118 store code or other computer-executable programming instructions that, when read and executed by the processing system 106, cause the processing system 106 to generate, implement, or otherwise execute an event monitoring application that supports autonomously activating hands-free functionality of one or more onboard systems 108, 110, 112, 114, 116 and providing a bridge for communications between the onboard system(s) 108, 110, 112, 114, 116 and an external system in response to detecting an event onboard the aircraft 120, as described in greater detail below.

In some embodiments, the processing system 106 implements a speech recognition engine (or voice recognition engine) and/or speech-to-text system adapted to receive audio input from a user. In such embodiments, the processing system 106 may also include various filters, analog-to-digital converters (ADCs), digital-to-analog converters (DACs), speech synthesizers, and the like, which are suitably configured to support operations of the aircraft system 100 (e.g., receiving auditory input from the user input device 104 or providing auditory feedback via the audio output device 105). Additionally, the processing system 106 may also implement or support a speech generation engine and/or text-to-speech system adapted to generate audio output based on text or other data received from another system 108, 110, 112, 114, 116 onboard the aircraft 120.

The display system 108 generally represents the hardware, circuitry, processing logic, and/or other components configured to control the display and/or rendering of one or more navigational maps and/or other displays pertaining to operation of the aircraft 120 and/or systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

Still referring to FIG. 1, in an exemplary embodiment, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 112 is also capable of obtaining or otherwise determining the heading of the aircraft 120 (i.e., the direction the aircraft is traveling in relative to some reference).

In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system or another suitable data link system.

In an exemplary embodiment, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. It should be noted that although FIG. 1 depicts a single avionics system 116, in practice, the aircraft system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the aircraft system 100 and/or aircraft 120 will likely include one or more of the following avionics systems suitably configured to support operation of the aircraft 120: a weather system, an air traffic management system, a radar system, a traffic avoidance system, an autopilot system, an autothrottle (or autothrust) system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In one or more embodiments, the FMS 114 includes or otherwise accesses a data storage element (e.g., data storage element 118) storing computer-executable programming instructions or other data for execution that, when read and executed by the FMS 114, cause the FMS 114 to create, generate, or otherwise facilitate an autopilot module configured to support autonomous operation of the aircraft 120 and support other automated actions or operations of the aircraft 120 in conjunction with the avionics systems 116. For example, the data storage element 118 may include data or information utilized by the FMS 114 to model flight characteristics of the aircraft 120, construct or otherwise generate flight paths for the aircraft 120, determine corresponding thrust setting(s) for the aircraft 120, and the like.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 102, the user input device 104, the audio output device 105, and the processing system 106 as being located onboard the aircraft 120 (e.g., in the cockpit), in some embodiments, the display device 102, the user input device 104, the audio output device 105, and/or the processing system 106 may be implemented as an electronic flight bag that is separate from the aircraft 120 but capable of being communicatively coupled to the other elements of the aircraft system 100 when onboard the aircraft 120. Furthermore, practical embodiments of the aircraft system 100 and/or aircraft 120 will include numerous other devices and components for providing additional functions and features, as will be appreciated in the art. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114, that is, the processing system 106 may be a component of the FMS 114.

Figure 2:
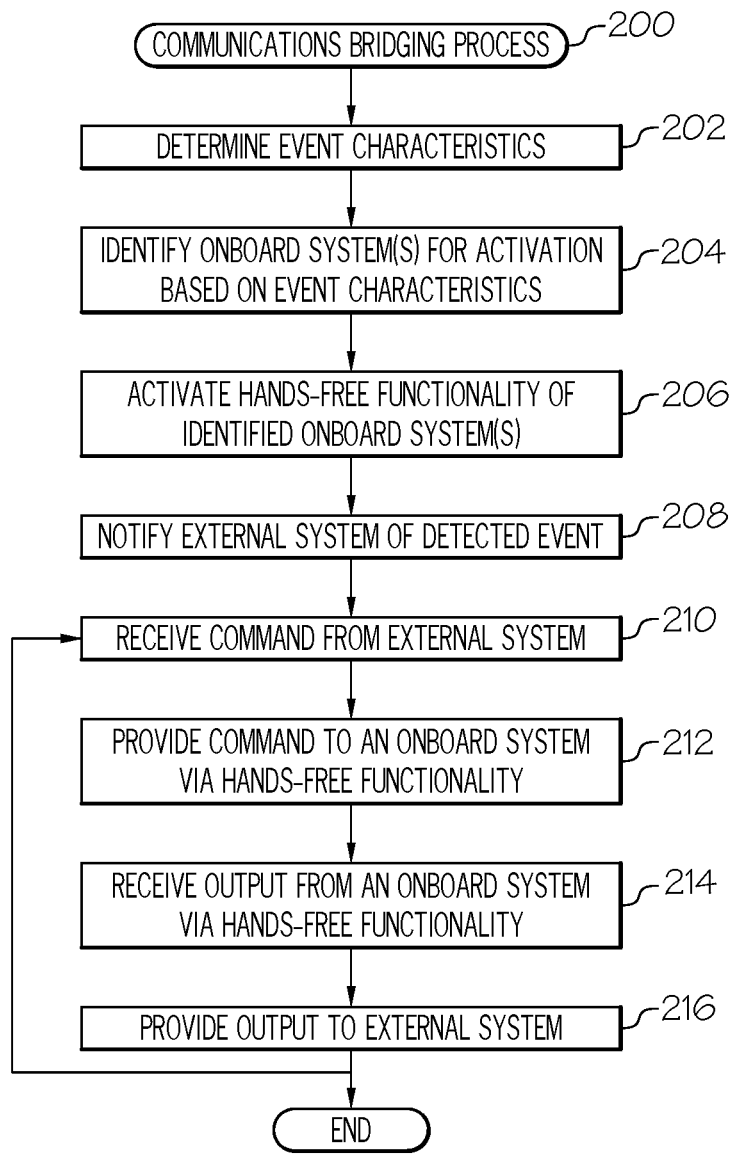
FIG. 2 is a flow diagram of an exemplary communications bridging process suitable for use with the aircraft system of FIG. 1 in accordance with one or more embodiments.

Referring now to FIG. 2, in an exemplary embodiment, the system 100 is configured to support a communications bridging process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the communications bridging process 200 may be performed by different elements of the system 100; that said, for purposes of explanation, the communications bridging process 200 may be described herein primarily in context of being performed primarily by the processing system 106 and/or the FMS 114. It should be appreciated that the communications bridging process 200 may include any number of additional or alternative tasks, the tasks need not be performed in the illustrated order and/or the tasks may be performed concurrently, and/or the communications bridging process 200 may be incorporated into a more comprehensive procedure or process having additional functionality not described in detail herein. Moreover, one or more of the tasks shown and described in the context of FIG. 2 could be omitted from a practical embodiment of the communications bridging process 200 as long as the intended overall functionality remains intact.

Referring to FIG. 2 with continued reference to FIG. 1, the communications bridging process 200 is performed in response to detecting or otherwise identifying an event with respect to manual operation of the aircraft 120 based at least in part on the output of one or more systems 108, 110, 112, 114, 116 onboard the aircraft 120. For example, an event monitoring application executing on the processing system 106 and/or the FMS 114 may continually monitor the user interface devices 104, 105 and the output of the onboard systems 108, 110, 112, 114, 116 for an output signal or data (or a combination thereof) that is indicative of an event that could impact a user's ability to operate the aircraft 120. In this regard, the processing system 106 and/or the FMS 114 may continually monitor one or more sensor systems 116 onboard the aircraft 120 to detect or otherwise when sensor measurements are indicative of an environmental event onboard the aircraft 120 (e.g., smoke, fire, or the like). As another example, the processing system 106 and/or the FMS 114 may continually monitor inputs and/or outputs to the user interface devices 104, 105 and/or communications system 110 to detect or otherwise identify when a pilot is incapacitated or otherwise not operating the aircraft 120 (e.g., based on an absence of inputs via the user interface devices 104, 105 and/or a failure to respond to communications via the communications system 110). Likewise, the processing system 106 and/or the FMS 114 may continually monitor any number of onboard systems 108, 110, 112, 114, 116 for output (or combinations of outputs) to identify a mechanical event or other operational event that may impair manual operation of the aircraft 120. In this regard, the processing system 106 and/or the FMS 114 may be capable of detecting or identifying any number of different types of events that could impact manual operation of the aircraft 120, based on any combination of signals, outputs or data provided by any number of onboard devices or systems 104, 105, 108, 110, 112, 114, 116, and accordingly, the subject matter described herein is not limited to any particular type of event or manner of detection. For example, an event may be detected based on a pattern or temporal relationship between the signals, outputs or data provided by any combination of onboard devices or systems 104, 105, 108, 110, 112, 114, 116 over a given period of time.

In response to detecting an event, the communications bridging process 200 identifies or otherwise determines characteristics associated with the event (task 202). For example, based on the signals, data, or other output provided by the onboard systems 108, 110, 112, 114, 116, the event monitoring application may determine an event type and potentially other attributes associated with the detected event. In this regard, the event monitoring application may classify the event as one of a number of higher-level event types, such as an environmental event, a mechanical event, an operational event, an incapacitation event, or the like, while also identifying other attributes associated with the event or classifying the event into further sub-types (e.g., fire, smoke, impairment of a particular mechanical component or system 108, 110, 112, 114, 116, a pilot exiting the cockpit, and the like). The event monitoring application may also be capable of characterizing the intensity or severity of the particular event based on measurement data obtained from onboard sensor systems 116 and/or other operational information or status data received from one or more onboard systems 108, 110, 112, 114, 116. Additionally, based on the signals, data, or other output provided by the user interface devices 104, 105, the event monitoring application may determine the current status of the pilot(s) or other crew members onboard the aircraft 120, such as, for example, whether the pilot is non-responsive, incapacitated, outside the cockpit, or the like. In this regard, some embodiments of the aircraft system 100 may include motion sensors or other detection equipment that are capable of measuring, sensing, or otherwise determining the presence or activity level of individuals within the cockpit or other locations throughout the aircraft 120 to facilitate characterizing or determining the pilot status.

Based on the pilot status, event type, and/or other event characteristics, the communications bridging process 200 identifies or determines which onboard system(s) should have their hands-free functionality enabled or activated to support remote communications (task 204). In this regard, the event monitoring application determines which onboard systems 108, 110, 112, 114, 116 may be desired to be enabled to be controlled by a remote operator or external control system to mitigate the impact of the detected event and/or which onboard systems 108, 110, 112, 114, 116 may be desired to provide feedback to a remote operator or external control system to facilitate remote analysis and/or control of the aircraft 120. For example, in response to detecting a depressurization event or low oxygen levels in the cockpit, the event monitoring application may identify a hands-free functionality of a flight control system 116 or the FMS 114 should be enabled to allow descent to lower altitude to be initiated or controlled remotely in the event the pilot and/or co-pilot is experiencing hypoxia or a loss of consciousness. Additionally, the event monitoring application may identify onboard systems 108, 110, 112, 114, 116 that should be disabled to prevent control by a remote operator or external control system or otherwise deconflict between the remote operation and concurrent manual operation (e.g., when the pilot status indicates the pilot is able to control at least some aspects of the aircraft 120). For example, in response to a depressurization event or low oxygen levels in the cockpit, the event monitoring application may disable one or more user input devices 104 or disable certain manual functionalities of one or more onboard systems 108, 110, 112, 114, 116 to limit potential operation by a confused or disoriented pilot.

After identifying the appropriate onboard systems for activation, the communications bridging process 200 autonomously commands, signals, or otherwise initiates activation of the hands-free functionality of the identified onboard systems to enable remote communications via the hands-free functionality (task 206). For example, the event monitoring application at the processing system 106 may transmit or otherwise provide, to the identified destination onboard system(s) 108, 110, 112, 114, 116 via an avionics bus or similar communications interface, a command or signal to initiate activation of a hands-free functionality supported by the destination onboard system(s) 108, 110, 112, 114, 116. In this regard, the command or signal provided by the event monitoring application emulates the command or signals that would be provided to enable the hands-free functionality if the pilot or other user were attempting to enable the hands-free functionality of the destination onboard system(s) 108, 110, 112, 114, 116 but without requiring any action by the pilot or other user to do so. Additionally, in scenarios where deconfliction between the pilot and a remote controller may be appropriate, the event monitoring application at the processing system 106 may similarly transmit or otherwise provide a corresponding command or signal to disable or deactivate the hands-free functionality supported by the deconflicted onboard system(s) 108, 110, 112, 114, 116.

The communications bridging process 200 also transmits or otherwise provides notification to an external system of the detected event with respect to manual operation of the aircraft to thereby notify the external system for responding to mitigate the event (task 208). For example, the event monitoring application at the processing system 106 may transmit or otherwise provide, to an external system via the communications system 110, an indication or notification of a detected event onboard the aircraft 120 that includes identification of the event type, the pilot status and/or other characteristics of the detected event that were detected, identified, or otherwise determined by the event monitoring application based on the onboard devices and systems 104, 105, 108, 110, 112, 114, 116.

In one or more embodiments, the external system is realized as a ground operations center or similar facility located on the ground that includes one or more flight tracking stations equipped to track, analyze, and otherwise monitor operations of one or more aircraft 120. In this regard, the flight tracking station generally represents a computer or other computing system at the ground operations center that may be operated by ground personnel, such as a flight dispatcher or air traffic controller, to monitor and track the flight of the aircraft 120. In an exemplary embodiment, the flight tracking station generally includes a user input device, a display device, a communications system, a processing system, and a data storage element. The display device may be realized as an electronic display coupled to the processing system that is capable of graphically displaying a flight tracking display that includes information or other data associated with operation of the aircraft 120 under control of the processing system. The user input device is coupled to the processing system, and the user input device and the processing system are cooperatively configured to allow ground personnel monitoring the aircraft 120 to interact with the flight tracking station to communicate commands or instructions back to the aircraft 120 via the communications system, and thereby remotely control or operate the aircraft 120, as described in greater detail below in the context of FIGS. 3-5. Depending on the embodiment, the user input device could be realized as any sort of keypad, touchpad, keyboard, mouse, touch panel (or touchscreen), joystick, knob, line select key or another suitable device adapted to receive input from a user, such as an audio input device, such as a microphone, audio transducer, audio sensor, or the like.

Still referring to FIG. 2, after initiating activation of the hands-free functionality of the desired onboard system(s) and notifying the external system of the detected event, the illustrated communications bridging process 200 continues by receiving or otherwise obtaining one or more commands from the external system and providing the command(s) to the appropriate onboard system(s) via the hands-free functionality that was autonomously activated in response to the detected event (tasks 210, 212). Additionally, the illustrated embodiment of the communications bridging process 200 receives or otherwise obtains the output or other feedback from one or more onboard systems and provides the output to the external system using the autonomously-activated hands-free functionality (tasks 214, 216). In this regard, speech-to-text, text-to-speech, speech recognition, natural language processing, or other hands-free functionality supported by the onboard systems is utilized to translate communications from the external system into a format that can be parsed or acted on by the onboard system or vice versa to provide an effective bridge for communications between the external system and the onboard systems in lieu of manual interaction by a pilot or other user onboard the aircraft 120. Thus, the external system is capable of receiving feedback from various systems 108, 110, 112, 114, 116 onboard the aircraft 120 and presenting or otherwise providing the information to a remote operator or other ground personnel for analysis and determining corresponding commands or instructions for operating one or more onboard systems 108, 110, 112, 114, 116 to achieve some automated action to mitigate or compensate for the detected event in an autonomous manner without manual interaction or other reliance on a pilot that may otherwise be distracted, confused, overburdened, unavailable, incapacitated, or the like. The loop defined by tasks 210, 212, 214, 216 may repeat indefinitely throughout the remainder of the flight until being overridden by a pilot, co-pilot, or other user onboard the aircraft 120 or until the detected event has been resolved or fully mitigated. In this regard, in some embodiments, the event monitoring application may continually monitor the onboard devices and systems 104, 105, 108, 110, 112, 114, 116 to similarly detect or otherwise identify when a previously detected event ceases to exist. In response, the event monitoring application may effectively undo aspects of the communications bridging process 200, for example, by deactivating or disabling the hands-free functionality of previously-identified destination onboard system(s), reactivating or reenabling the hands-free functionality of any deconflicted onboard system(s), providing notification of the absence or resolution of the detected event to the external system, and the like.

Figure 3:
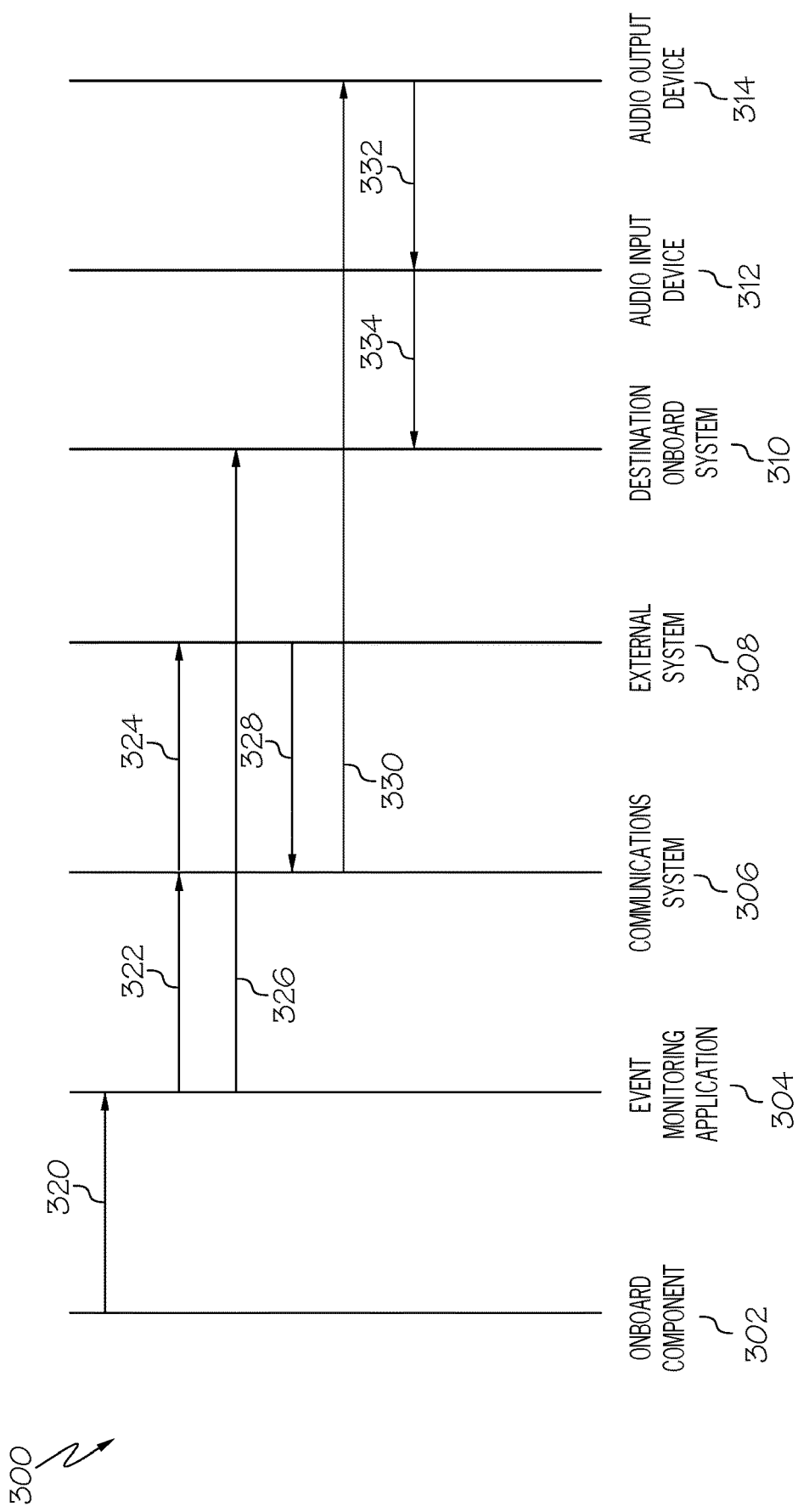
FIGS. 3-6 depicts exemplary sequences of communications within an aircraft system in connection with one or more embodiments of the communications bridging process of FIG. 2.

FIG. 3 depicts an exemplary sequence 300 of communications within the aircraft system 100 in accordance with one or more embodiments of the communications bridging process 200 of FIG. 2. Referring to FIG. 3 with continued reference to FIGS. 1-2, as described above, the illustrated sequence 300 begins with an event monitoring application 304 (which may be executing at or on one of the processing system 106 or the FMS 114) continually monitoring 320 the output, signals, or data provided by an onboard component 302 to detect occurrence of an event that may impact manual operation of the aircraft 120. In this regard, the onboard component 302 could include or otherwise be realized as any one of the devices or systems 104, 105, 108, 110, 112, 114, 116 described above or any number, type or combination of sensors, detectors, or the like that are capable of outputting sensed measurement data indicative of a particular event. In response to detecting the event, the event monitoring application 304 characterizes the event and transmits or otherwise provides 322, 324 notification of the detected event, the determined pilot status, the determined event type, and/or other characteristics associated with the detected event to an external system 308 (e.g., tasks 202, 208). In the illustrated embodiment, the event monitoring application 304 transmits or otherwise provides 322 the notification in the form of a message or other command or instruction that encapsulates or is otherwise encoded with the detected event information and identification of the external system that is provided to an onboard communications system 306 (e.g., communications system 110), which, in turn causes the onboard communications system 306 transmitting, relaying, or otherwise providing the corresponding notification and associated event information to the external system 308. In this regard, depending on the embodiment, the communications system 306 and the external system 308 may be capable or communicating over a communications network (e.g., the Internet, a satellite network, a cellular network, or the like), a data link infrastructure, a data link service provider, a radio network, or the like. Based on the characteristics of the detected event, the event monitoring application 304 also identifies at least one destination onboard system 310 to be activated and then transmits or otherwise provides 326 a command or instruction to the destination onboard system 310 that initiates activation of a hands-free functionality at the destination onboard system 310 (e.g., tasks 204, 206).

FIG. 3 depicts an exemplary scenario where the event monitoring application 304 activates a speech-to-text functionality or other speech recognition functionality of the destination onboard system 310 to enable the destination onboard system 310 to receive a command for an automated action from the external system 308 via an audio input device 312 (e.g., audio input device 104). In this regard, FIG. 3 depicts an example where the audio input device 312 is coupled to the destination onboard system 310 via an avionics bus or similar communications interface, however, in other embodiments, the audio input device 312 may be communicatively coupled to the destination onboard system 310 via an intermediary component (e.g., the processing system 106 or the FMS 114) that provides captured audio to the onboard system 310. A remote operator at a flight tracking station or similar computing device of the external system 308 may identify or otherwise determine an automated action to be performed by the destination onboard system 310 and then transmit or otherwise provide 328 the command for the automated action to the aircraft 120 via the communications system at the external system 308.

The illustrated embodiment of FIG. 3 depicts a scenario where the command is provided in an auditory format from the external system 308. For example, ground personnel at the external system 308 may utilize a communications radio to orally provide a command or instruction to the aircraft 120. The communications system 306 onboard the aircraft 120 receives the command and provides 330 (e.g., via an avionics bus) the auditory command to an audio output device 314 onboard the aircraft 120 (e.g., audio output device 105) for reproduction of the received audio. The audio output device 314 generates or otherwise provides 332 a corresponding auditory output audio signal that is received or otherwise captured by the audio input device 312. When enabled or activated, the speech-to-text functionality or other speech recognition functionality at the destination onboard system 310 continually monitors the output of the audio input device 312 and thereby receives 334 the audio command signal that is recognized or otherwise resolved into a command for an automated action to be performed by the destination onboard system 310. For example, the speech-to-text functionality at the destination onboard system 310 may convert the command audio signal into a corresponding textual representation, which is then parsed or otherwise analyzed at the destination onboard system 310 using a specific recognition vocabular, command protocols, natural language processing and/or the like to identify the automated action commanded to be performed by the destination onboard system 310 along with parameters, attributes, or the like that characterize the manner in which the automated action is to be performed. Thereafter, the destination onboard system 310 automatically and autonomously performs the commanded action without requiring any manual intervention or oversight. For example, in a situation where it is detected that the pilot is incapacitated or outside of the cockpit and not able to communicate with air traffic control (ATC), the communications bridging process 200 allows the system 100 to receive the audio from the ATC and convert the audio to commands that will be processed by other onboard avionics systems 108, 110, 112, 114, 116 to allow the ATC to remotely control or direct the aircraft 120.

Figure 4:
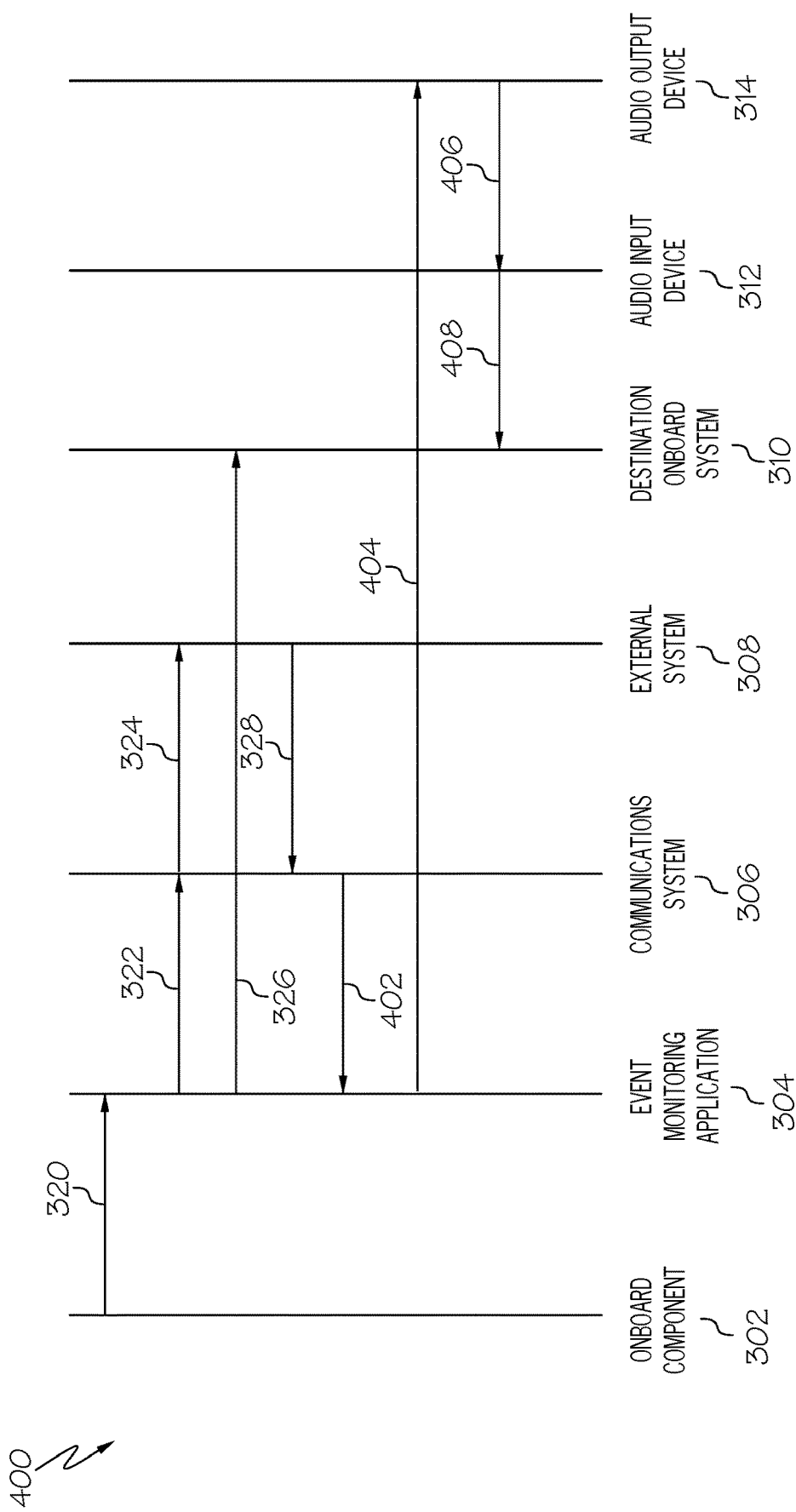

FIG. 4 depicts another exemplary sequence 400 of communications within the aircraft system 100 in accordance with one or more embodiments of the communications bridging process 200 of FIG. 2. In this regard, FIG. 4 depicts a scenario where the command is provided in a text- or message-based format from the external system 308, rather than an audio format as described in the context of FIG. 3. In such an embodiment, the event monitoring application 304 receives or otherwise obtains 402 the command message or text from the communications system 306 and then performs text-to-speech conversion to generate a corresponding audio signal that is provided 404 to the audio output device 314 for reproduction. Thereafter, as described above, the speech-to-text functionality or other speech recognition functionality at the destination onboard system 310 receives, parses, and executes the audio command received via the audio input device 312 in a similar manner as described above in the context of FIG. 3.

Figure 5:
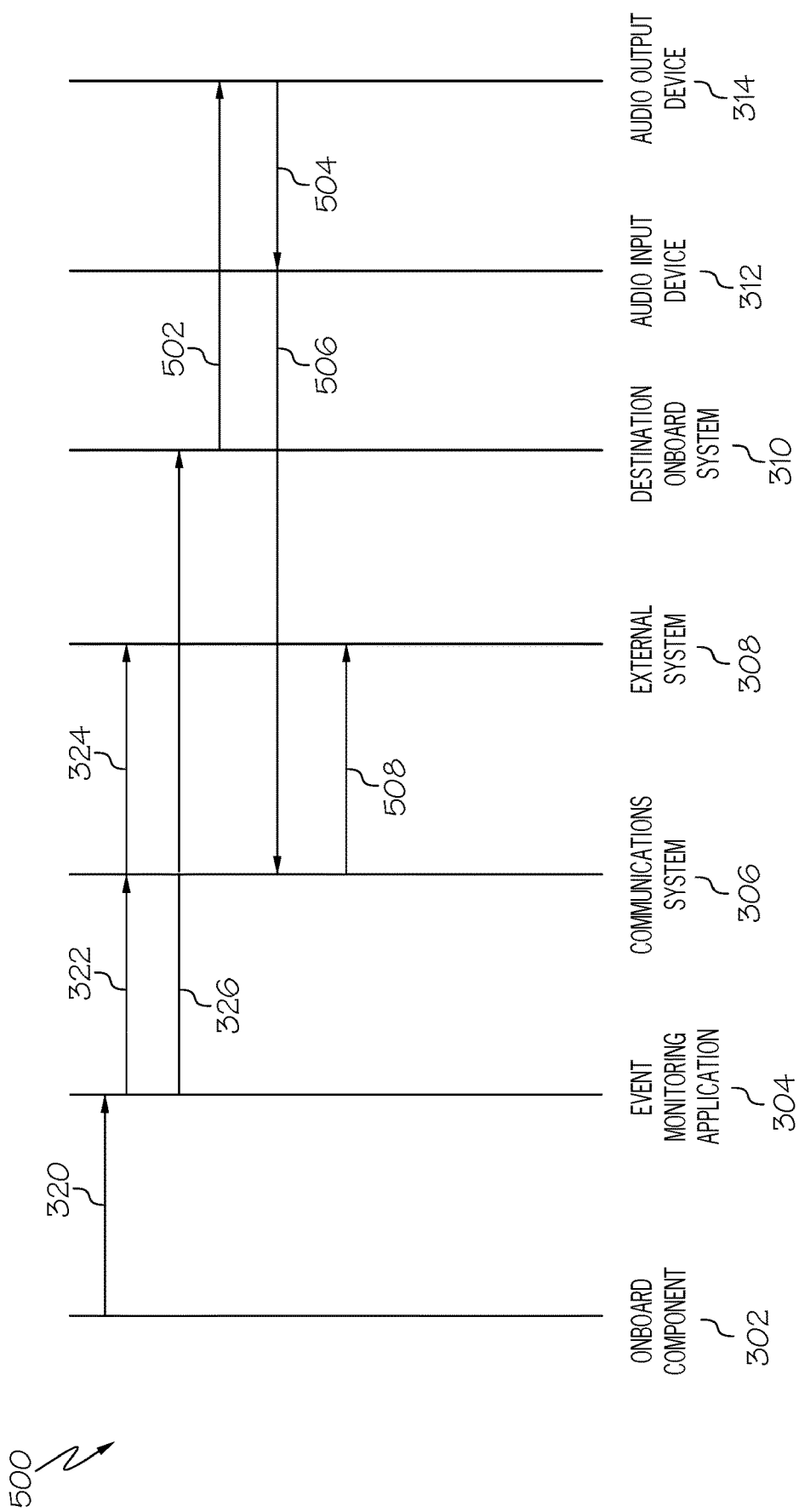

FIG. 5 depicts another exemplary sequence 500 of communications within the aircraft system 100 in accordance with one or more embodiments of the communications bridging process 200 of FIG. 2. In this regard, FIG. 5 depicts an example scenario where the event monitoring application 304 configures the destination onboard system 310 to provide output or other feedback to the external system 308 using hands-free functionality (e.g., tasks 214, 216). In the embodiment of FIG. 5, the output from the onboard system 310 is provided to the external system 308 in an audio format. In this regard, after the event monitoring application 304 transmits or otherwise provides 326 a command or instruction to the destination onboard system 310 that initiates activation of a text-to-speech functionality or other speech synthesis functionality at the destination onboard system 310 (e.g., tasks 204, 206), the text-to-speech functionality at the destination onboard system 310 translates or otherwise converts what would otherwise be a textual or message-based output by the destination onboard system 310 into a corresponding audio signal that is provided 502 to the audio output device 314 for reproduction. For example, in response to detecting smoke in the cockpit, the event monitoring application 304 may enable the text-to-speech functionality associated with the display system 108 or the onboard avionics system 110, 112, 114, 116 currently generating or providing the information displayed on the display device 102 to allow for the depicted information to be read out to the pilot in the event the pilot is unable to see what is presented the display device 102. In the illustrated embodiment, the audio signal is also received or otherwise captured 504 by the audio input device 312 and provided 506 to the communications system 306, which, in turn transmits or otherwise provides the audio to the external system 308 via a radio network or the like. A flight tracking station at the external system 308 may then reproduce the audio at the flight tracking station for review or analysis by a remote operator or other ground personnel.

Figure 6:
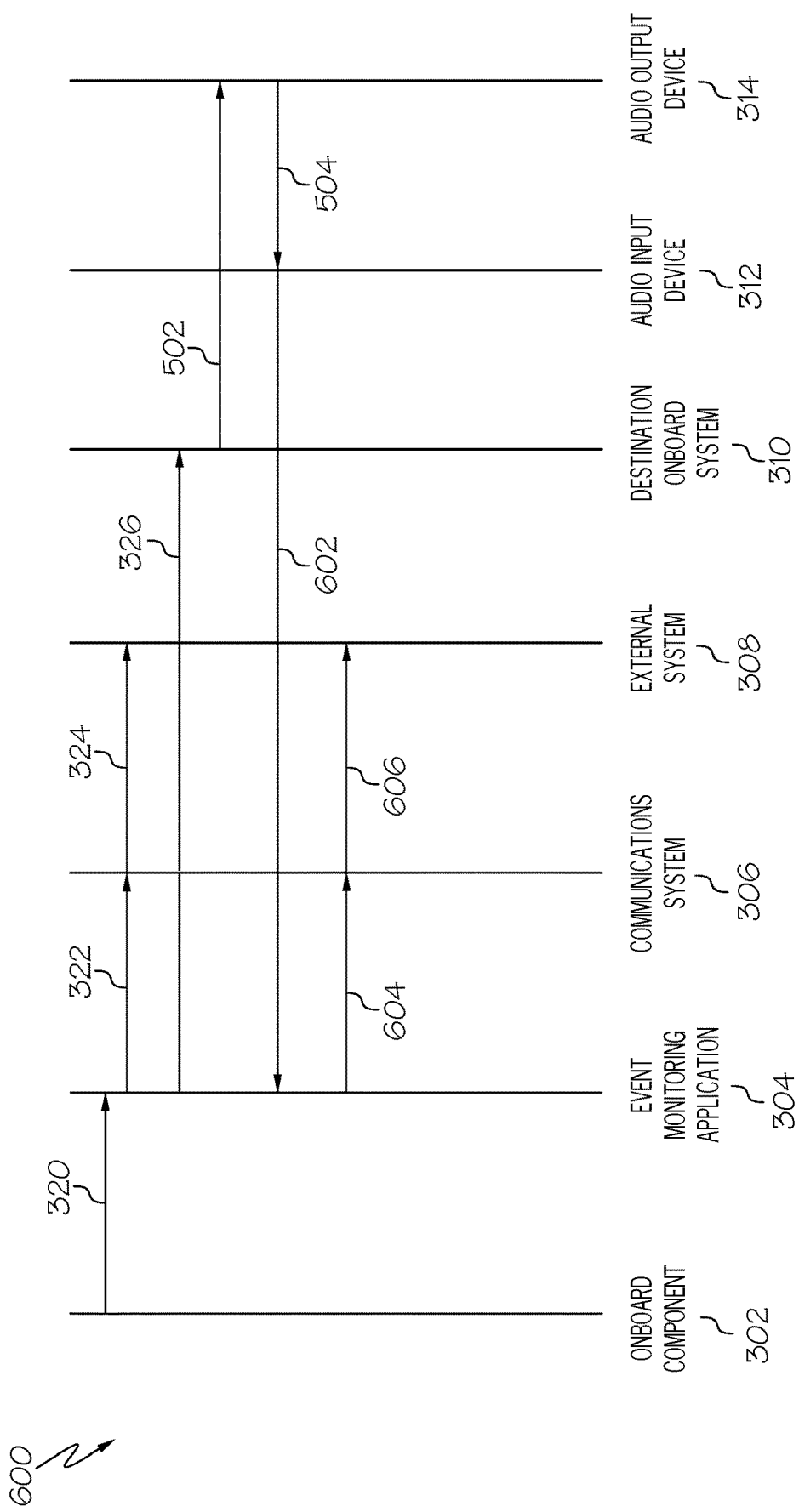

FIG. 6 depicts another exemplary sequence 600 of communications within the aircraft system 100 in accordance with one or more embodiments of the communications bridging process 200 of FIG. 2. In this regard, FIG. 5 depicts an example scenario where the event monitoring application 304 performs text-to-speech conversion to translate or otherwise convert the audio output from the onboard system 310 into a corresponding text or message-based format that is provided to the external system 308. In this regard, the event monitoring application 304 receives or otherwise obtains 602 the audio signal captured 504 by the audio input device 312, converts the audio into a corresponding textual representation, and then transmits or otherwise provides 604 the textual representation of the output of the onboard system 310 to the communications system 306, which, in turn, transmits or otherwise provides 606 the corresponding message or communication to the external system 308. A flight tracking station at the external system 308 may decode the message received from the aircraft 120 then generate or otherwise provide a graphical representation of the textual output from the onboard system 310 on a display device at the flight tracking station for review or analysis by a remote operator or other ground personnel.

To briefly summarize, the subject matter described herein allows for commands, data, or other information to be communicated between onboard systems and an external system using hands-free functionality in an autonomous manner in response to detecting events that could impact or otherwise impair manual operation of an aircraft or other vehicle. In this regard, speech-to-text, text-to-speech, speech recognition, speech synthesis, natural language processing, and the like may be utilized to effectively bridge communications between an onboard system and an external system remote from the vehicle that would otherwise be incapable of direct communications. Additionally, the detection of the event and subsequent activation of hands-free functionality is performed autonomously and without requiring manual oversight or interaction, thereby accounting for any potential incapacity, unavailability, or other inability of a pilot, co-pilot, or other onboard operator with respect to controlling the vehicle.

For the sake of brevity, conventional techniques related to flight management systems (FMSs) and other avionics systems, autopilot or other autonomous or automated aircraft behaviors, speech recognition or generation, natural language processing, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of autonomously enabling remote operation of a vehicle, the method comprising:
autonomously detecting an event with respect to manual operation of the vehicle based at least in part on output from one or more systems onboard the vehicle;
identifying a hands-free functionality of a vehicle system to be activated based at least in part on a characteristic of the event;
autonomously initiating activation of the hands-free functionality of the vehicle system;
deactivating a second hands-free functionality of a second vehicle system to be deconflicted with the hands-free functionality of the vehicle system;
receiving, from an external system via an onboard communications system, a command for operating the vehicle; and
providing the command to the vehicle system using the hands-free functionality.

2. The method of claim 1, wherein autonomously initiating activation of the hands-free functionality of the vehicle system comprises autonomously initiating activation of the hands-free functionality of an autopilot system.

3. The method of claim 2, further comprising:
receiving, by the autopilot system, the command for an automated action via the hands-free functionality; and
autonomously adjusting, by the autopilot system, an onboard component to influence operation of the vehicle and achieve the automated action in accordance with the command.

4. The method of claim 1, the characteristic comprising an operator status, wherein identifying the hands-free functionality of the vehicle system comprises identifying the vehicle system based on the operator status.

5. The method of claim 4, further comprising providing, via the onboard communications system, notification of the operator status to the external system prior to receiving the command.

6. The method of claim 1, wherein the hands-free functionality comprises a text-to-speech functionality.

7. The method of claim 1, wherein the hands-free functionality comprises a speech-to-text functionality.

8. A non-transitory computer-readable medium having computer-executable instructions stored thereon that, when executed by a processing system onboard the vehicle, cause the processing system to perform the method of claim 1.

9. A method of autonomously enabling remote control of an aircraft, the method comprising:
autonomously detecting an event with respect to manual operation of the aircraft based at least in part on output from a component onboard the aircraft;
determining an onboard system to be activated based on a characteristic of the event;
autonomously initiating activation of a hands-free functionality of the onboard system; and
generating an audio representation of a command for an automated action received from an external system via a communications system onboard the aircraft, wherein the onboard system thereafter receives, via the hands-free functionality, the audio representation of the command and automatically performs the automated action in accordance with the command in response to receiving the audio representation of the command via the hands-free functionality.

10. The method of claim 9, the onboard system comprising an autopilot system, wherein:
determining the onboard system comprises determining the autopilot system should be activated based on a pilot status;
autonomously initiating activation of the hands-free functionality comprises autonomously initiating activation of the hands-free functionality of the autopilot system; and
the autopilot system automatically performs the automated action by autonomously adjusting an onboard component to influence operation of the aircraft in accordance with the command.

11. The method of claim 10, further comprising determining the pilot status based on output from one or more user interface devices onboard the aircraft.

12. The method of claim 9, further comprising:
providing, via a communications system onboard the aircraft, notification of the event to an external system; and
receiving the command from the external system via the communications system.

13. The method of claim 9, further comprising deactivating a second hands-free functionality of a second onboard system to deconflict the hands-free functionality of the onboard system.

14. The method of claim 9, wherein the component comprises at least one of a camera or a sensor located in a cockpit of the aircraft.

15. An aircraft system comprising:
an avionics system onboard an aircraft;
a second system onboard the aircraft to provide output data indicative of an event;
a communications system to receive a command for operating the aircraft from an external system; and
a processing system coupled to the avionics system, the second system and the communications system to autonomously detect the event based at least in part on the output from the second system and autonomously initiate activation of a hands-free functionality of the avionics system in response to detecting the event, wherein:
the avionics system receives the command via the hands-free functionality; and
the processing system is coupled to the communications system to provide notification of the event to the external system prior to receipt of the command.

16. The aircraft system of claim 15, wherein the avionics system is capable of performing an automated action by autonomously adjusting a mechanical or electrical configuration of an onboard component to influence operation of the aircraft in accordance with the command.

17. The aircraft system of claim 15, further comprising:
an audio output device coupled to the communications system to generate an audio representation of the command; and
an audio input device coupled to the avionics system, wherein the hands-free functionality of the avionics system receives the audio representation of the command from the audio input device.

* * * * *